United States Patent [19]
Symes et al.

[11] Patent Number: 6,039,900
[45] Date of Patent: Mar. 21, 2000

[54] PARTICULATE POLYMERIC MATERIALS AND THEIR PRODUCTION

[75] Inventors: Kenneth Charles Symes; Kishor Kumar Mistry, both of West Yorkshire, United Kingdom

[73] Assignee: Allied Colloids Limited, West Yorkshire, United Kingdom

[21] Appl. No.: 09/106,904

[22] Filed: Jun. 30, 1998

[30] Foreign Application Priority Data

Jun. 30, 1997 [GB] United Kingdom .................... 9713812

[51] Int. Cl.⁷ .............................. B01J 13/02; B01J 13/16
[52] U.S. Cl. ......................... 264/4.1; 264/4.33; 264/4.7; 427/213.3; 427/213.34; 427/213.36
[58] Field of Search ................................. 264/4.1, 4.33, 264/4.7; 427/213.3, 213.34, 213.36

[56] References Cited

U.S. PATENT DOCUMENTS

| | | |
|---|---|---|
| 3,580,880 | 5/1971 | Clarke et al. . |
| 3,607,821 | 9/1971 | Clarke et al. . |
| 3,875,262 | 4/1975 | Milne . |

FOREIGN PATENT DOCUMENTS

| | | |
|---|---|---|
| 18652/70 | 2/1972 | Australia . |
| 0707018 | 4/1996 | European Pat. Off. . |
| 1198052 | 7/1970 | United Kingdom . |
| 1268692 | 3/1972 | United Kingdom . |
| 2207681 | 2/1989 | United Kingdom . |
| 1231614 | 5/1991 | United Kingdom . |
| 94/25560 | 11/1994 | WIPO . |
| 95/07613 | 3/1995 | WIPO . |
| 97/24177 | 7/1997 | WIPO . |
| 97/24179 | 7/1997 | WIPO . |

*Primary Examiner*—Nathan M. Nutter
*Attorney, Agent, or Firm*—Sughrue, Mion, Zinn, Macpeak & Seas, PLLC

[57] ABSTRACT

A dispersion is formed of aqueous polymer particles in a non-aqueous liquid and a stabiliser is covalently reacted on to the particles.

15 Claims, No Drawings

PARTICULATE POLYMERIC MATERIALS AND THEIR PRODUCTION

BACKGROUND OF THE INVENTION

1. Field of the Invention

This invention relates to the formation of polymeric particles (ie particles having an external surface of organic polymer) which give improved stability when dispersed in a liquid.

2. Description of the Related Art

Processes are described in PCT/GB96/03233 for forming particulate compositions comprising particles having a hydrophilic core within a shell comprising a membrane comprising an association product of (a) an interfacial condensation product (IFC) formed by reaction in a non-aqueous liquid between a first IFC reactant having at least two first condensation groups and the second IFC reactant having at least two second condensation groups and (b) an amphipathic polymeric stabiliser which will concentrate at the interface between oil and water and which has recurring hydrophobic groups and recurring reactive hydrophilic groups which associate with the second condensation groups. After formation in the non-aqueous liquid, the particles are dispersed in liquid electrolyte.

It is explained in that application that the association may comprise a condensation reaction and, in particular, condensation may occur when the stabiliser is a copolymer of an ethylenically unsaturated carboxylic anhydride such as maleic anhydride and the second condensation groups are amino groups. It is also explained, however, that the association preferably comprises forming an internal, ring-formed salt between the adjacent carboxylic groups of a stabiliser formed from a monomer such as maleic acid or maleic anhydride with an IFC reactant which is a polyamine.

We have found that the best performance is generally achieved when the formation of the IFC shell does depend on the use of a polycarboxylic stabiliser which is in hydrolysed acid form rather than anhydride form, and this is probably due to the fact that internal salt formation occurs and that covalent reaction between the amine and the carboxylic acid groups does not occur during normal processing.

We have also found that when particles are made in this way, the resultant particles sometimes have less dispersion-stability than is desirable, especially when they are subsequently dispersed in an aqueous electrolyte solution (such as a liquid detergent concentrate).

We have found that, when developing these unpublished processes, it is difficult simultaneously to optimise the shell formation and the stability of the particles in the final liquid dispersion. We believe that this may arise because of there being different requirements for optimum shell formation and for optimum stability, and because of the differences in the continuous phase. We believe that optimum shell formation may often be promoted by some degree of ionic association between the stabiliser and IFC reactant groups, but we believe that materials which are optimum for undergoing this ionic association may give less satisfactory stability in the final dispersion. Conversely, materials which may give optimum stability in the final dispersion appear to give less adequate shell formation.

Our object, arising out of this unpublished work, is to try to obtain a better combination of properties during manufacture and during long term storage in the electrolyte.

As regards information which has been published, it is well known to stabilise a dispersion of particles in a liquid (for instance a non-aqueous liquid) by including in the dispersion an amphipathic polymeric stabiliser, that is to say a stabiliser formed from hydrophobic groups and hydrophilic (generally ionic) groups. When, as is common, the stabiliser is used for stabilising hydrophilic polymer particles in a hydrophobic environment, the hydrophilic units in the polymer are attracted to the polymer particles and the stabiliser thereby becomes attached to the polymer particles. The mechanism in many instances may be ionic but other types of physical adsorption may be utilised.

A difficulty with this type of stabiliser is that its performance properties are significantly influenced by the nature of the liquid in which the particles are dispersed. If that liquid is changed then the stabiliser may become much less effective. For instance the stabiliser may be effective when the particles are dispersed in a non-aqueous liquid but may be much less effective or wholly ineffective when the continuous phase (the first liquid) of the initial dispersion is changed to a different continuous phase (a second liquid). This change may be brought about by a solvent swap techniques as described in WO94/25560 or it may be brought about by dispersing the initial dispersion into the second liquid. Particular problems arise when the second liquid contains electrolyte.

It would therefore be desirable to be able to improve the self-stabilising properties of polymer particles so that they have the potential to have improved stability even though the continuous phase may be changed from a first (usually non-aqueous) liquid to a different, second, liquid (which is usually aqueous electrolyte).

Stabilisers for different dispersions are known from, for instance, GB-A-1,198,052, GB-A-1,231,614, GB-A-1,268,692, GB-A-2,207,681, AU-A-455,165, U.S. Pat. No. 3,580,880, U.S. Pat. No. 3,875,262, EP-A-707,018 and EP-A-719,085.

BRIEF SUMMARY OF THE INVENTION

According to the invention, we provide a process comprising forming a dispersion in a first non-aqueous liquid of aqueous polymer particles having an outer surface which includes reactive groups, and covalently reacting a reactive stabiliser material with some of the reactive groups and thereby forming a dispersion of the particles with the stabiliser material covalently bonded on to the outer surface of the particles.

DETAILED DESCRIPTION OF THE INVENTION

By saying that we covalently react the stabiliser material with some of the reactive groups, we mean that there is sufficient covalent bonding between the stabiliser material and the reactive groups to ensure that the stabiliser is attached to the particles by sufficient covalent bonding to hold the stabiliser material in place despite reasonable changes in the continuous phase in which the particles may be dispersed. For instance the stabiliser material should remain in place, and give a stabilising effect, even though the continuous phase may change from a first non-aqueous, predominantly hydrocarbon, liquid to the second liquid, which may be a relatively high electrolyte liquid. There can additionally be some ionic bonding or other forms of association but there must be sufficient covalent bonding to dominate the performance of the particles when the continuous phase is changed.

The number of reactive groups which remain unreacted after covalently reacting the stabiliser material on to the particles is often unimportant but in practice there will always be some reactive groups that do not react covalently with the stabiliser. For instance some of the reactive groups will be prevented from reacting because of steric hindrance between the stabiliser and the particle surface. Some of the reactive groups will be prevented from reacting covalently because they may react in another manner, for instance forming an ionic complex. In practice some of the reactive groups may remain unreacted because there is a stoichiometric excess of reactive groups on the polymer particles over groups on the stabiliser that can react with them.

The particles may be relatively large particles such that they can be separated from the continuous liquid phase and utilised as, for instance, powder. Thus, for instance, they may have a size above 30 $\mu$m, for instance in the range 100 to 100 $\mu$m. For instance the invention can be useful when such particles are being processed or transported in a continuous phase of a second liquid different from the first liquid. The invention can minimise aggregation or other instability problems that might otherwise occur despite keeping the dispersion of coarse particles in the continuous phase stirred to prevent sedimentation.

Preferably however, the invention is applied to the production of particles which have a size at least 90% by weight below 30 $\mu$m, preferably below 10 or 20 $\mu$m, and in particular to the production of particles which are provided as a substantially stable dispersion in a liquid. The invention reduces or eliminates the risk of the particles aggregating and/or sedimenting, both at low concentrations (e.g., down to 0.1% by weight) and at higher concentrations (e.g., 5% or even much higher such as 30% or 50% in some liquids).

Generally the process comprises the additional step of providing the particles as a dispersion in a second liquid before or (usually) after the covalent reaction, wherein the covalently bonded stabiliser on the particles promotes the stability of the dispersion in the second liquid. Thus, by the invention, a substantially stable dispersion of the particles may be formed in a first liquid and then these particles may be dispersed in a second liquid in which the dispersion would have been less stable if the covalent bonding of the invention had not been applied. In particular, by the invention the dispersion in the second liquid is preferably more stable than if the same stabiliser material is simply mixed into the final dispersion of particles in the second liquid, without the covalent reaction. Generally the covalent reaction is conducted in the first, non-aqueous, liquid and the resultant self-stabilised particles are dispersed in the second liquid. However, if desired the first liquid may be exchanged with another non-aqueous liquid (or some other liquid such a surfactant) before the covalent reaction or even before adding the stabiliser.

The second liquid is an electrolyte. It is usually an aqueous liquid or is a water miscible liquid, and generally it contains at least 0.5% by weight electrolyte, often at least 3% and generally at least 5% up to, for instance, 30% or 50% by weight electrolyte. The electrolyte may be inorganic or organic and monomeric or polymeric. Preferably the electrolyte includes anionic or cationic surfactant, most preferably anionic surfactant. Accordingly the second liquid may be an aqueous or non-aqueous liquid detergent concentrate.

The change of the continuous phase from the first liquid to the second liquid can be conducted in various ways. For instance it can be achieved by adding the second liquid and distilling off the first liquid (for instance as described in WO94/25560). This "solvent swap" technique may be conducted so as to put the particles into the second liquid in which the self-stabilising properties are required, or this product may itself be dispersed in the second liquid so as to disperse the particles in the second liquid. For instance the particles may initially be formed in a hydrocarbon which is the first liquid, this continuous phase may then be changed to a non-ionic surfactant, glycol or other water miscible organic liquid, and this water miscible liquid can be the second liquid or, alternatively, the dispersion in this water miscible liquid can then be mixed into the final second liquid in which the particles are to be substantially self-stabilising. The stabiliser which is to react with the polymer is usually reacted with the polymer while in the first liquid, but the reaction may be deferred until the particles are in the second liquid, or in a water miscible liquid.

The dispersion in the water miscible liquid may be mixed into a second liquid having a high electrolyte concentration. Alternatively the dispersion in the first liquid may be mixed direct into the aqueous electrolyte.

The dispersion in first non-aqueous liquid of the particles may be made by dispersing preformed aqueous polymer particles in the liquid or may be made by forming the particles in that liquid as a dispersion. The particles are polymeric, that is to say their outer surface is polymeric, and also includes the reactive groups.

The particles may be formed of a matrix of a polymer which carries the reactive groups and which, for instance, extends throughout the particles. For instance the particles may be aqueous polymer particles made by polymerising droplets of aqueous monomer or monomer blend while dispersed in a first non-aqueous liquid (for instance by reverse phase polymerisation in a non-aqueous liquid) or the particles may be made by dispersing in a liquid (often a non-aqueous liquid) polymeric material in liquid form and converting it to solid particles. For instance the polymeric material may be introduced as a solution in water or as an emulsion in water and the resultant aqueous polymer particles of solution or emulsion may then be converted to solid form, for instance by distilling or otherwise removing the water from the dispersion of those particles in the first liquid. The particles may contain an active ingredient dispersed throughout the matrix.

As an example, the particles may be formed of a polymer of acrylic acid, hydroxy ethyl acrylate or a glycidyl acrylate, optionally copolymerised with other water soluble monomer such as acrylamide, so that the particles are then formed of an addition polymer having free carboxylic, hydroxyl or epoxy groups, which then serve as the reactive groups.

It is often preferred that the particles should have a shell-core configuration wherein the core contains an active ingredient and the shell is formed of a polymer carrying the reactive groups. The core may include a matrix polymer or may consist solely of reactive ingredient, and optionally a non-polymeric carrier or diluent.

The shell may be formed by any convenient technique. It may be formed by, for instance, coacervation of one or more polymers, wherein at least one of the polymers in the coacervate carries reactive groups. For instance polymers that are used for coacervation may consist of or include polymers carrying the carboxylic groups such as polyacrylic acid or natural polymers such as carboxy methyl cellulose.

Preferably, however, the shell is formed by interfacial condensation (IFC). Suitable combinations of materials for forming the shell by IFC are described in U.S. application Ser. No. 08/860,564 which is incorporated herein by reference. Any of these may be used in the invention. Such methods produce aqueous polymer particles, having a hydrophilic core.

The reactive groups on the polymer particles can be epoxide or hydroxyl groups (in which even the covalent bond will be an ether). They can be carboxylic groups (free acid, water soluble salt, anhydride or acid halide) in which event the covalent linkage can be an ester or amide linkage. Preferably, however, the reactive groups are amino groups in which event the covalent linkage is preferably an amide linkage, formed by reaction between these amino groups and carboxylic groups which can be covalently bonded with them.

Although covalent bonding can be achieved between carboxylic free acid, salt or halide groups and amino groups, the covalent reaction generally occurs much more easily if the carboxylic groups are in the form of anhydride groups and thus preferably the reactive groups are amino groups and the stabiliser provides dicarboxylic anhydride groups.

We believe that one reason why some existing stabiliser systems are less effective in, for instance, aqueous electrolytes is that the reactive groups on many of the particles that are under consideration are ionisable (for instance being cationic or anionic) and the stabiliser is usually counterionic so that the attraction between the stabiliser and the particle is primarily ionic. This ionic attraction can be displaced by, for instance, changes in the electrolyte concentration.

In the invention, it is preferred that the reactive groups on the polymer are ionisable and the stabiliser is a counterionic material or a derivative (such as an anhydride) of a counterionic material and which is now covalently bonded to the particles in contrast to being ionically attached, as in prior processes.

The stabiliser material can be a monomeric material which achieves the self-stabilising effect merely by covalently blocking sufficient of the ionisable reactive groups on the polymer particles that the stabilising effecting is not significantly altered by moderate changes in electrolyte concentrate. For instance, amino reactive groups on the particles would normally be ionisable, but if they are reacted with a monomeric anhydride or acid halide they are covalently blocked and so cannot ionise. This prevention of ionisation is, in some environments, sufficient to maintain self-stabilising properties when the continuous phase is changed.

Accordingly the invention includes processes in which the stabilising material is a monomeric anhydride or acid halide such as acetic anhydride, acetyl chloride, maleic anhydride or succinic anhydride and which is covalently reacted on to polymer particles having free amino groups so as to form amide groups. When these particles carrying amide groups are dispersed into a detergent or other electrolyte liquid, optionally in the presence of additional polymeric stabiliser which is unreactive with the particles, the particles are self stabilising.

By this we mean that improved stability is obtainable compared to the stability that is achieved when the same particles are dispersed into the same liquid (in the presence of the same extra stabiliser if that is used) but without the prior reaction with the anhydride or acid halide.

Preferably, however, the stabilising material which is used in the invention is a reactive copolymer of hydrophilic monomer units and hydrophobic monomer units, i.e., it is an amphipathic polymer. The hydrophilic units are attracted to the aqueous polymer particles and the hydrophobic units are attracted to the non-aqueous liquid. The amount of water in the particles may be above 10% by weight of the particles but may be considerably less provided the polymer or the core is hydrophilic.

Suitable hydrophobic monomers and hydrophilic monomers and their amounts (except for the groups which are to react) are given in PCT/GB96/03233. The hydrophilic monomer units should provide groups which will react covalently with the reactive groups on the particles. Preferably the stabiliser is a copolymer of dicarboxylic anhydride monomer units and the reactive groups on the particles are amino groups.

The preferred aspects of the invention are those in which the dispersion in the first liquid is formed by IFC polymerisation in the presence of a first stabiliser which is a copolymer of hydrophobic units with hydrophilic units which preferably include dicarboxylic units and wherein the dicarboxylic units (if present) are in the hydrolysed form (free acid, acid salt or acid halide) and a second stabiliser is reacted with amino groups from the IFC polymerisation and the second stabiliser is a copolymer of hydrophobic monomer units with hydrophilic monomer units which include dicarboxylic acid units and wherein the dicarboxylic units include anhydride groups, whereby they will enter into covalent amide formation with the amino groups. Other stabilisers which have hydrophilic monomer units which can react covalently with the amino groups may be used.

In PCT/GB96/03233 we described a process in which IFC particles containing amine groups are made in the presence of one such stabiliser, either free dicarboxylic acid or anhydride, and preferably the present invention does not include such an IFC process using, as the sole stabiliser, such a polymer which is hydrolysed (so that all the dicarboxylic acid groups are free acid or salt form) or mainly unhydrolysed anhydride, mainly meaning preferably above 80%.

We can obtain useful results using a polymer which is partially hydrolysed eg 20–80% anhydride and 80–20% dicarboxylic acid or acid salt, preferably 30–80% dicarboxylic acid.

We have now found that best results are achieved by using a combination of stabilisers (generally amphipathic stabilisers) wherein the first will predominantly enter into ionic association with the amino IFC reactant (so as to promote shell formation) and the other will enter into covalent reaction with the amino groups, so as to bond stabiliser to the surface of the particles and so as to block some or all of the ionisable amino groups. The first may have free dicarboxylic acid groups without anhydride, and the second may have anhydride groups.

Good results are also obtained when the amount of anhydride monomer units is low, e.g., 1 to 10% by weight of the monomers or when 1 to 10% glycidyl monomer units are included instead of the anhydride units.

The remaining hydrophilic units in the stabiliser can be mono- or di- carboxylic acid monomer units and/or hydroxyalkyl monomer units, generally to provide 10 to 30 mole % ionic or other hydrophilic units, with the balance being hydrophobic (see PCT/GB96/03233). Suitable hydrophobic groups include fatty (C8–24) alkyl acrylates or methacrylates, C1–4 alkyl acrylates or methacrylates and styrenes.

The second carboxylic stabiliser, or other stabilising material which is to react with the reactive groups, may be added at any time such that it achieves the desired effect and blocks the ionisable groups in the final particles. For instance the particles may be formed initially with the reactive groups on them (optionally in the presence of a polymeric stabiliser) and then the stabilising material may be reacted covalently on to the particles having the reactive groups. Thus the particles may be formed in the presence of one stabiliser (which is unreactive) and then the reactive stabiliser is added and reacted on to the particles. As another example, the stabiliser which is to react with the reactive groups may be added before the formation of the particles is completed.

The stabiliser which is to be covalently reacted on to the reactive groups may be incorporated before the interfacial condensation reaction is started. For instance both a dicarboxylic acid stabiliser and a dicarboxylic anhydride stabiliser may be present before the IFC is initiated. For instance the stabiliser which is to promote wall formation (e.g., the dicarboxylic acid stabiliser) may be present during the emulsification of the aqueous core phase into a non-aqueous liquid, and the stabiliser which is to react covalently with amino or other reactive groups is then added, for instance with the other IFC reactant.

Irrespective of when the various materials are added, the process of the invention preferably includes a reaction stage at the end of the particle formation (or subsequently) in order to allow the reaction which forms the covalent linkages. For instance the dispersion may be left to react at ambient temperature for, for instance 3 to 48 hours, but preferably the reaction is driven by heating, e.g., to 30 to 90° C., preferably 35° C. to 60° C. or 70° C., for 1 to 18 hours, e.g., 3 to 16 hours at 35–55° C.

The addition of the reactive stabiliser material is often made after the particles have been made in the first liquid, e.g., after the polymerisation of monomers or after the IFC shell formation is substantially complete.

The invention also includes novel polymeric particles which are self-stabilised and which have an outer surface which includes reactive groups wherein a polymer stabiliser has been covalently bonded on to the particles. Preferably the covalent bond between each particle and the stabiliser is an amide bond formed between reactive amino groups on the particles and dicarboxylic anhydride groups on the stabiliser.

An active ingredient may be present in the polymer particles, generally in the matrix polymer when the particles are formed of a polymer matrix, or in the core of a shell core particle. It can be any active ingredient which is useful for the eventual use of the particles. For instance it can be an agricultural active ingredient such as a herbicide, insecticide, or pesticide. It may be a fragrance, it may be a pharmaceutical or it may be a biologically produced material of any type. For instance it may be an enzyme.

The following are examples.

EXAMPLE 1

This example shows that the microcapsules obtained in Example 1 of PCT/GB96/03233 when using hydrolysed maleic acid copolymer stabiliser can be post treated to improve the capsules from aggregating in liquid detergent formulations.

Acetic anhydride (2.5 parts) was added to 50 parts of microcapsules dispersion in surfactant (Capsules A) under stirring. The mixture formed was allowed to react for 1 hour at room temperature (20° C.) to give Capsules B.

The capsules A and B were separately dosed into commercial heavy duty liquid detergents at 0.10 KNPU/g protease activity. Each one of the detergent mixtures was placed in an oven at 40° C. and subjected to the accelerated storage test.

After 24 hours, the detergent mixture containing Capsules A had aggregated and settled to the bottom of the container.

The acetic anhydride treated microcapsules (Capsule B) remained dispersed and showed no signs of instability. After, further 3 days at 40° C., Capsules B showed formation of fine aggregates.

EXAMPLE 2

Microcapsules were prepared according to Example 1 of PCT/GB96/03233 except that an oil-soluble stabiliser having a proportion (about 25%) of unhydrolysed (maleic anhydride) groups in the stabilising polymer was employed instead of the fully hydrolysed version.

The resulting capsules (Capsules C) were dosed in liquid detergent at 0.10 KNPU/g enzyme activity and placed in an oven at 40° C. Also, a comparative detergent mixture was made with Capsules A (Example 1 of PCT/GB96/03233). Capsules A aggregated and settled to the bottom of the container after 1 day storage. Capsules C remain dispersed and showed no signs of instability after 1, 4 and 7 days storage.

EXAMPLE 3

A dispersion of microcapsules was prepared as in Example 1 of PCT/GB96/03233 using a polymeric stabiliser in which the hydrophilic groups are hydrolysed to maleic acid groups. The dispersion was then treated as in that Example first to dehydrate the dispersion to provide anhydrous particles in hydrocarbon, then to exchange the hydrocarbon with a non-ionic surfactant to provide an anhydrous dispersion in non-ionic surfactant, and then to mix this dispersion into a heavy duty liquid detergent at 0.10 KNPU/g enzyme activity.

When an addition of the same polymeric stabiliser, but in the unhydrolysed, anhydride form, was made to the wet or dry dispersion in hydrocarbon or the dispersion in non-aqueous liquid, it was found that storage stability was improved compared to the process without the addition of this extra, anhydride, stabiliser.

EXAMPLE 4

The dispersion in hydrocarbon in Example 3, before dehydration, has added to it a solution in hydrocarbon of reactive copolymer stabiliser formed from (by weight) 65% stearyl methacrylate, 17.5% styrene, 15% maleic acid and 2.5% maleic anhydride, or from 55% stearyl methacrylate, 33% methyl methacrylate, 10% methacrylic acid and 2% glycidyl methacrylate. The resultant dispersion was, in each instance, stirred overnight at 40° C. to allow covalent reaction to occur between the stabiliser and the IFC shell.

We claim:

1. A process of making self-stabilising polymeric particles, the process comprising forming a dispersion in a first non-aqueous liquid of aqueous polymer particles having an outer surface which includes reactive groups and covalently reacting a reactive stabilising material with some of the reactive groups and thereby forming a dispersion of the particles with the stabiliser covalently bonded on to the outer surface of the particles wherein said reactive stabiliser material is a copolymer of hydrophilic monomer units and hydrophobic monomer units.

2. A process according to claim 1 in which the particles have a size below 30 μm and the process comprises the additional step of providing the particles as a dispersion in a second liquid after the covalent reaction, and in which the covalently bonded stabiliser on the particles promotes the stability of the dispersion in the second liquid.

3. A process according to claim 2 in which the second liquid is a liquid electrolyte.

4. A process according to claim 1 in which the particles are formed of a hydrophilic matrix polymer carrying the reactive groups.

5. A process according to claim 1 in which the particles have a shell core configuration wherein the shell is formed of a polymer carrying the reactive groups.

6. A process according to claim 5 in which the shell is formed by coacervation.

7. A process according to claim 5 in which the shell is formed by interfacial condensation.

8. A process according to claim 1 in which the reactive groups are epoxide or hydroxyl and the covalent linkage is an ether, or the reactive groups are amino groups and the covalent linkage is an amide, or the reactive groups are carboxylic free acid or anhydride or acid halide or salt and the covalent linkage is an ester or amide.

9. A process according to claim 8 in which the reactive groups are amino groups and the covalent linkages are amide groups.

10. A process according to claim 1 in which the reactive groups are ionisable and the reactive stabiliser reacts covalently with the ionisable groups substantially to block the ionisable groups.

11. A process according to claim 1 in which the reactive stabiliser material is a material which, when covalently bonded to the particles, provides improved stabilisation in a chosen liquid compared to the stabilisation which is achieved using the same stabiliser when absorbed or ionically associated with the particles in the same liquid.

12. A process according to claim 1 in which the particles have a shell core configuration and the shell is made by interfacial condensation in the presence of a first polymeric stabiliser which is a copolymer of hydrophobic monomer units with hydrophilic monomer units and wherein the shell has free reactive amino groups, and the reactive stabiliser is a copolymer of hydrophobic monomer units with hydrophilic monomer units which include units which react covalently with the amino groups.

13. A process according to claim 1 in which the reactive stabiliser material is a copolymer of hydrophilic monomer units comprising dicarboxylic anhydride units, and hydrophobic monomer units.

14. A process according to claim 13 in which 20–80% by weight of the dicarboxylic acid units are present as anhydride and 80 to 20% as free acid or acid salt.

15. A process according to claim 1 in which the reactive stabiliser material is added after the particles have been formed in the first liquid.

* * * * *